Patented Oct. 4, 1932

1,880,440

UNITED STATES PATENT OFFICE

RUDOLPH HEIDENREICH, OF LEVERKUSEN-ON-THE-RHINE, GERMANY, ASSIGNOR TO GENERAL ANILINE WORKS, INC., OF NEW YORK, N. Y., A CORPORATION OF DELAWARE

NEW VAT DYESTUFFS OF THE ANTHANTHRONE SERIES

No Drawing. Application filed February 15, 1928, Serial No. 254,620, and in Germany March 8, 1927.

The present invention relates to a process for the production of vat dyestuffs of the anthanthrone series and the new dyestuffs obtainable thereby.

I have found that, when reacting with a halogenated anthanthrone, which may be otherwise substituted upon an aminoanthraquinone compound i. e. upon aminoanthraquinones themselves or such aminoanthraquinones as contain other substituents in the nucleus, new dyestuffs are obtainable, which dye from the alkaline hydrosulfite vat fast dyeings of various shades.

I prefer to dissolve or suspend the components in a high boiling organic solvent, such as naphthalene or nitrobenzene and to add to the reaction mixture an acid binding agent, such as, for instance, sodium acetate, and a suitable catalyst, such as copper or its salts, and to heat the reaction mixture to the boiling point for some hours, while stirring, whereby the greatest part of the dyestuffs formed deposit. They may be isolated in the usual manner, for instance, when using naphthalene as dissolving agent, by diluting the melt with hot solvent naphtha or other suitable solvents, filtering, washing the residue with alcohol and treating it with hot diluted hydrochloric acid in order to remove the metal salts.

The products, thus obtained, which partly still contain halogen, are strongly colored powders, dissolving in strong sulfuric acid with various colors which are changed by the addition of formaldehyde, if aminoanthraquinone compounds containing at least one amino group in the $\alpha$-position are used as the one component. From the alkaline hydrosulfite vat they dye cotton strong clear dyeings of various tints.

The following examples illustrate my invention without limiting it thereto:—

Example 1.—4.6 parts by weight of synthetic dibromoanthanthrone of the probable formula:—

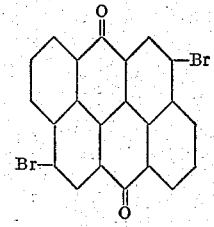

produced from 1:1'-dinaphthyl-4:4'-dibromo-8:8'-dicarboxylic acid with ring closing agents such as strong sulfuric acid aluminium chloride or the like are heated to boiling for 4 to 5 hours, while stirring, with 150 parts by weight of naphthalene, 5 parts by weight of $\alpha$-aminoanthraquinone, 2⅓ parts by weight of anhydrous sodium acetate and 0.5 parts by weight of copper acetate.

The melt, after being cooled a little, but while still liquid, is diluted with hot solvent naphtha or some other appropriate solvent, filtered and washed with hot solvent naphtha and then with hot alcohol. The dark residue is boiled with dilute hydrochloric acid in order to remove inorganic salts and dried. Greyish violet microscopic needles are thus obtained, which dissolve in cold concentrated sulfuric acid with a green coloration, (more bluish than that of dibromoanthanthrone), and which changes to a beautiful blue on the addition of para-formaldehyde. When the green sulfuric acid solution is poured into water, violet flakes are produced, which give a clear wine-red vat with caustic soda solution and hydrosulfite from which cotton is dyed a beautiful greyish blue after hanging, the fastness properties being very satisfactory.

By condensing in the same manner, instead of the synthetic dibromoanthanthrone, a bromoanthanthrone, produced by bromination of anthanthrone in oleum, with $\alpha$-aminoanthraquinone a greyish violet powder is obtained, which dissolves in concentrated sulfuric acid with a green coloration, giving with para formaldehyde a blue reaction and which dyes cotton from a clear wine-red vat powerful greyish-blue shades, possessing very satisfactory fastness properties.

*Example 2.*—By replacing the α-aminoanthraquinone employed in Example 1 by the same quantity of β-aminoanthraquinone a brown condensation product is obtained, which dissolves in concentrated sulfuric acid with an olive coloration giving no reaction with para-formaldehyde in concentrated sulfuric acid and which dyes cotton from a reddish-brown vat brown shades after hanging.

The product obtained in the same manner from commercial bromoanthanthrone (prepared by the bromination of anthanthrone) and β-aminoanthraquinone forms a somewhat greener solution in sulfuric acid and likewise dyes cotton brown shades.

*Example 3.*—4.6 parts by weight of synthetic dibromoanthanthrone (c. f. Example 1) are heated to boiling for several hours with 150 parts by weight of naphthalene, 2.6 parts by weight of sodium acetate, 0.5 parts by weight of copper acetate and 8 parts by weight of 1-benzoylamino-4-aminoanthraquinone. The working up is effected in the manner already described, whereupon microscopic grey blue needles are obtained, which dissolve in concentrated sulfuric acid with a yellowish green coloration. From this solution greenish blue flakes are precipitated by water and cotton is dyed from a dull wine-red vat a beautiful greenish blue shade, possessing very satisfactory fastness properties.

The dyestuff produced from brominated anthanthrone with 1-benzoylamino-4-aminoanthraquinone is very similar in its properties and shades on cotton to that just described.

*Example 4.*—By condensing commercial bromoanthanthrone similarly to the directions in Example 3 with 1-benzoylamino-5-amino-anthanthraquinone a condensation product is obtained, soluble in cold concentrated sulfuric acid with a yellowish brown coloration and which dyes cotton from a dull wine red vat powerful mouse grey to black shades the latter when dyed in a strength of about 6–7%.

The following claims are intended to also include, as obvious equivalents falling within the scope of my invention, the condensation products which are obtained when using commercial halogenated anthanthrones as one of the starting materials. The commercial halogenated anthanthrones, such as have been referred to in the last paragraph of Example 1 and in Example 4 consist principally of di-halogenated anthanthrone together with appreciable amounts of the mono-, tri- and tetra-halogenation products. The condensation products obtainable therefrom will, therefore, consist, for the most part, of the compounds hereinafter claimed in admixture with small amounts of anthanthrone substituted by one, three and four aminoanthraquinone radicals, which radicals, in turn, may be substituted by aroyl-amino groups.

I claim:—

1. The process which comprises reacting with dibromoanthanthrone of the probable formula

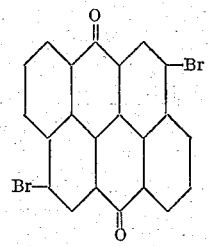

upon 1-benzoylamino-4-aminoanthraquinone in the presence of naphthalene, anhydrous sodium acetate and copper acetate by boiling the reaction mixture for some hours.

2. As a new product the compound of the probable formula

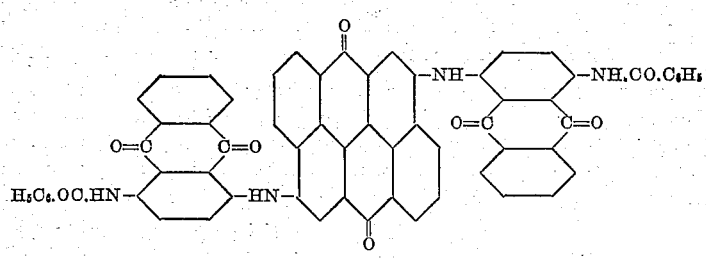

said product being a grey blue crystalline powder, dissolving in strong sulfuric acid with a yellowish green coloration and dyeing cotton from the alkaline hydrosulfite vat a beautiful greenish blue shade of very satisfactory fastness properties.

3. As new compounds the products of the probable formula:

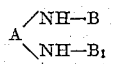

wherein A represents an anthanthrone nucleus and B and $B_1$ represent anthraquinone nuclei, which may be substituted by benzoylamino groups, said compounds being strongly colored powders soluble in strong sulfuric acid and dyeing cotton from the hydrosulfite vat strong clear dyeings.

4. As new compounds the products of the general formula:

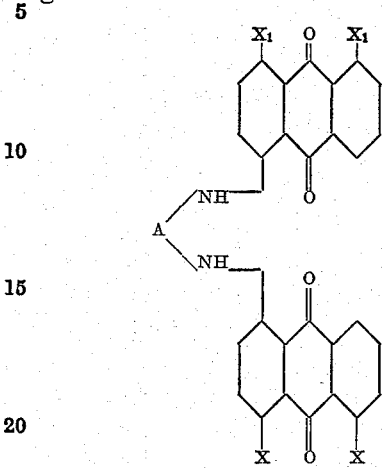

wherein A represents an anthanthrone nucleus, one X and one, $X_1$ stand for hydrogen, and the other X and $X_1$ stand for the group -NH.CO.$C_6H_5$, said compounds being dark powders, soluble in strong sulfuric acid with yellowish-green to yellowish-brown colors, dyeing cotton from the alkaline hydrosulfite vat strong and fast greenish-blue to greenish-grey shades.

5. The process which comprises reacting with an aminoanthraquinone which may be substituted in the nucleus by aroylamino groups upon a halogenated anthanthrone compound.

6. The process which comprises heating to boiling an aminoanthraquinone which may be substituted in the nucleus by aroylamino groups with a halogenated anthanthrone compound in the presence of a high boiling organic solvent, an acid binding agent and a copper catalyst.

7. The process which comprises reacting with an aminoanthraquinone which may be substituted in the nucleus by benzoylamino groups upon a brominated anthanthrone compound.

8. The process which comprises heating to boiling an aminoanthraquinone which may be substituted in the nucleus by benzoylamino groups with a brominated anthanthrone compound in the presence of a high boiling organic solvent, an acid binding agent and a copper catalyst.

9. The process which comprises heating to boiling an aminoanthraquinone which may be substituted in the nucleus by benzoylamino groups with a dibromoanthanthrone compound in the presence of a high boiling organic solvent, an acid binding agent and a copper catalyst.

10. The process which comprises reacting with an aminoanthraquinone which may be substituted in the nucleus by benzoylamino groups upon a dibromoanthanthrone of the probable formula:

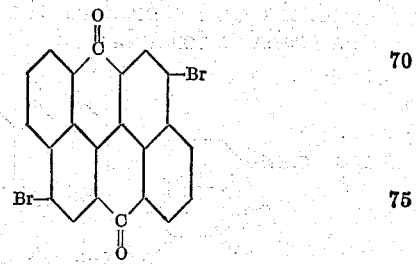

11. The process which comprises heating to boiling a dibromoanthanthrone of the probable formula:

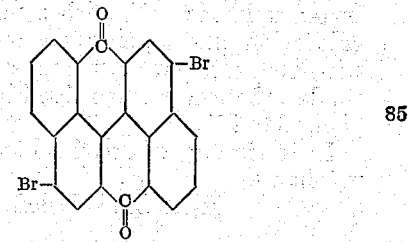

with an aminoanthraquinone compound of the probable general formula:

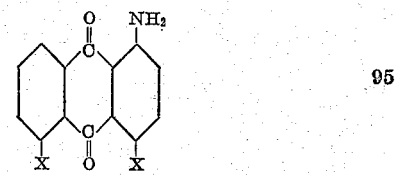

wherein one X stands for hydrogen and the other X for the group —NH.CO.$C_6H_5$, in the presence of a high boiling organic solvent, an acid binding agent and a copper catalyst.

12. As new compounds, the products of the probable formula:

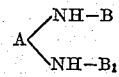

wherein A represents an anthanthrone nucleus and B and $B_1$ represent anthraquinone nuclei which may be substituted by aroyl amino groups, said compounds being strongly colored powders, soluble in strong sulfuric acid and dyeing cotton from the hydrosulfite vat strong, clear dyeings.

13. As a new product, the compound of the probable formula:

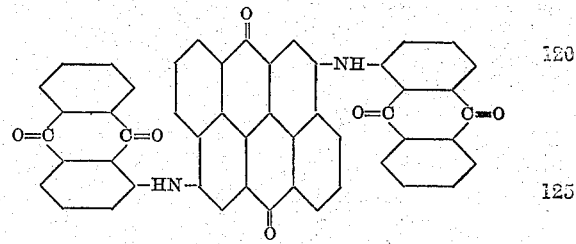

said product forming greyish-violet microscopic needles dissolving in concentrated sulfuric acid with a green coloration, dyeing cotton from a wine-red hydrosulfite vat greyish-blue shades of good fastness properties.

14. As a new product, the compound of the probable formula:

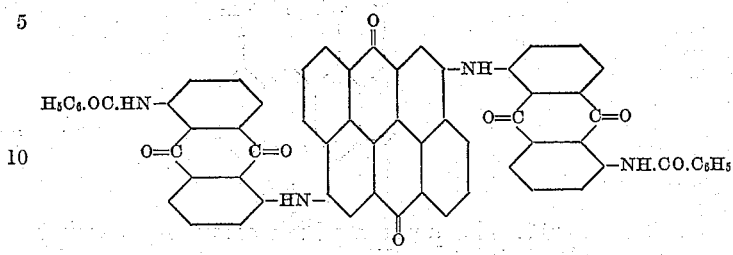

said product being soluble in cold concentrated sulfuric acid with a yellowish-brown coloration and dyeing cotton from a dull wine-red vat, powerful mouse-gray to black shades, the latter when dyed in a strength of about 6 to 7%.

In testimony whereof I have hereunto set my hand.

RUDOLF HEIDENREICH.